United States Patent [19]

Bauck et al.

[11] Patent Number: 4,768,124

[45] Date of Patent: * Aug. 30, 1988

[54] RECORD DISK CARTRIDGE WITH FLEXIBLE PAD

[75] Inventors: Randall C. Bauck, Davis County; Anton J. Radman, Weber County; Roy Thornock, Weber County; Robert D. Freeman, Weber County; Peter Kleczkowski, Weber County; Paul D. Losee, Davis County; Michael Lyon, Weber County, all of Utah

[73] Assignee: Iomega Corporation, Roy, Utah

[ * ] Notice: The portion of the term of this patent subsequent to Apr. 14, 2004 has been disclaimed.

[21] Appl. No.: 947,632

[22] Filed: Dec. 30, 1986

Related U.S. Application Data

[63] Continuation of Ser. No. 440,336, Nov. 9, 1982, Pat. No. 4,658,318, which is a continuation-in-part of Ser. No. 256,320, Apr. 22, 1981, Pat. No. 4,400,748.

[51] Int. Cl.$^4$ .................. G11B 23/03; G11B 5/012
[52] U.S. Cl. ........................... 360/133; 360/99; 206/444
[58] Field of Search .................. 360/97–99, 360/133–135; 206/444

[56] References Cited

U.S. PATENT DOCUMENTS

| 4,400,748 | 8/1983 | Bauck et al. | 360/99 X |
| 4,658,318 | 4/1987 | Bauck et al. | 360/133 X |

Primary Examiner—Stuart N. Hecker
Assistant Examiner—Alfonso Garcia
Attorney, Agent, or Firm—Woodcock Washburn Kurtz Mackiewicz & Norris

[57] ABSTRACT

A cartridge has a flexible pad which is disposed between a Bernoulli plate and a record disk when the cartridge is inserted into the disk drive. The flexible pad prevents ringing as the record disk is rotated against the Bernoulli plate. The cartridge has a slider which is opened when the cartridge is inserted into the drive to expose the record disk for rotation. This slider has a locking mechanism which can be opened only when the cartridge is properly inserted into the drive.

13 Claims, 3 Drawing Sheets

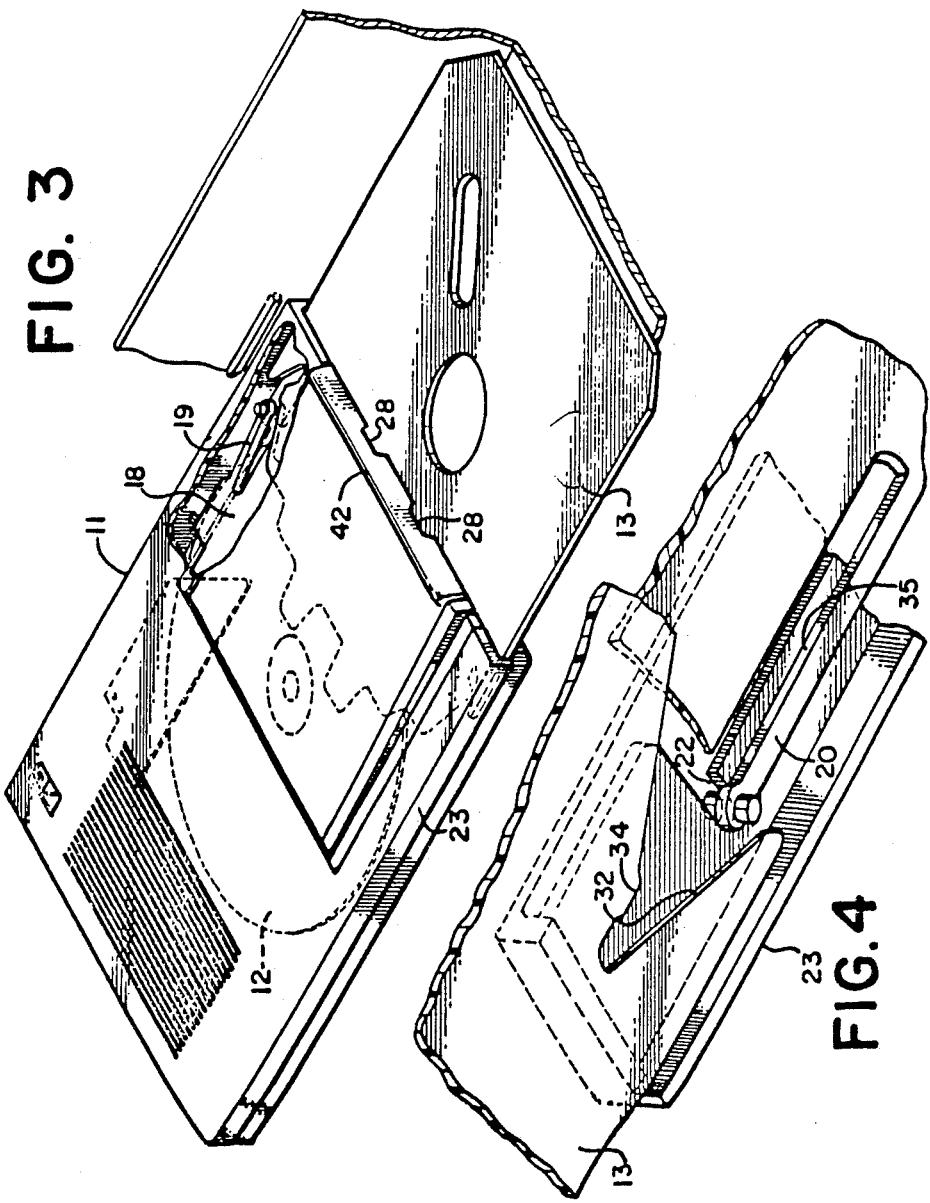

RECORD DISK CARTRIDGE WITH FLEXIBLE PAD

This application is a continuation of application Ser. No. 440,336, filed Nov. 9, 1982, now U.S. Pat. No. 4,658,318 which is a continuation-in-part of Ser. No. 256,320, filed Apr. 22, 1981, now U.S. Pat. No. 4,400,748, which is incorporated herein by reference.

BACKGROUND OF THE INVENTION

This invention relates to magnetic disk cartridges and more particularly, to an improvement in cartridges for disk drives in which a flexible magnetic disk is rotated in read/write relationship with a magnetic head.

Magnetic disk drives for data storage systems are generally of two different types. Rigid magnetic disks are rotated adjacent to magnetic read/write heads which "fly" on an airbearing in very close proximity to the disk. Close proximity allows high data densities. Consequently, rigid magnetic disks are generally used in large data processing systems. These rigid disks are expensive and delicate to manufacture. Recently, magnetic disk drives which write and read digital data from flexible magnetic disks have been extensively used. These are frequently referred to as "floppy disks". The drives in which they are used have been extensively used for small, so-called microcomputer, systems, for word-processing applications and the like. Because the disk is not rigid it cannot be rotated in close proximity to a flying head. Accordingly, data densities and reliability are lower.

In another type of disk drive, a floppy disk is rotated in close proximity to a fixed, flat "Bernoulli" plate. The thin layer of air between the disk and the plate tends to rotate with the disk and to be thrown outwardly by centrifugal force. This creates a vacuum between the plate and disk which tends to pull the disk close to the plate and cause it to behave in a substantially rigid manner. A flying head can be used in conjunction with disks stabilized in this manner, providing the advantage of high data density, but without the expense associated with rigid magnetic disks. U.S. Pat. No. 4,074,330—Norton, et al shows a disk drive having a Bernoulli plate for stabilizing a flexible disk to prevent flutter and to maintain an airbearing.

"FLEXIBLE MAGNETIC DISK DRIVE USING A RIGID CARTRIDGE," Ser. No. 256,320 Bauck et al, filed Apr. 22, 1981, now U.S. Pat. No. 4,400,748 incorporated herein by reference, describes a disk drive using a Bernoulli plate to stabilize a flexible disk which is contained in a rigid cartridge which protects the disk. In such disk drives, it is desirable to texturize the surface of the Bernoulli plate so that the magnetic media will not cling to the surface, or "ring" as with a perfectly smooth plate. "BERNOULLI PLATE FOR STABILIZATION OF FLEXIBLE MAGNETIC DISK," Ser. No. 257,482, Radman, et al, filed Apr. 24, 1981, now abandoned describes a disk drive with a Bernoulli plate which has been texturized to prevent ringing.

It is an object of the present invention to provide a more reliable, less expensive technique for preventing ringing of flexible magnetic disks which are stabilized against a Bernoulli plate.

The cartridge described in the aforementioned Bauck, et al application has a slider which closes the opening through which the disk is accessed when it is inserted into the disk drive. A locking mechanism prevents opening of the slider except when the cartridge is properly inserted into the disk drive.

It is another object of the present invention to provide an improved locking mechanism for a rigid magnetic disk cartridge of this type.

It is another object of the present invention to reduce the Bernoulli attraction of the disk to the cartridge base so as to allow use of the Bernoulli technique in a smaller size cartridge.

SUMMARY OF THE INVENTION

In accordance with the present invention, a magnetic disk cartridge has a flexible pad disposed between the Bernoulli plate and the disk when the cartridge is inserted into the disk drive to prevent ringing as the disk is rotated against the Bernoulli plate. The pad is fabricated of a soft, flexible, moisture-absorbent material which may be impregnated with disk lubricant. In carrying out the invention, in one embodiment, the flexible pad is positioned in the cartridge adjacent to the disk. In another embodiment, the pad is positioned on the Bernoulli plate.

In accordance with another aspect of the invention, the cartridge has a slider which is locked securely and can only be opened by inserting the cartridge into the disk drive, or by a special tool designed for that purpose. The locking mechanism is not apparent to the user, and this reduces the possibility of tampering with the disk media. The cartridge of the present invention provides the same convenience as flexible cartridges, but has the advantage of better protection of the disk media from contamination, better protection of the media from user tampering, mechanical protection of the rigid enclosure, accurate registration of the magnetic disk adjacent a Bernoulli plate, and the exploitation of the Bernoulli stabilization technique in a smaller, more compact cartridge.

The foregoing and other objects, features and advantages of the invention will be better understood from the following more detailed description and appended claims.

SHORT DESCRIPTION OF THE DRAWINGS

FIG. 1 is a view of the cartridge and the disk drive;
FIG. 2 is an exploded view of the cartridge;
FIG. 3 shows the locking mechanism in more detail;
FIG. 4 shows one of the two spring loaded tabs positioned in a locking recess in the cover the cartridge;
FIG. 5 shows a modification in which the pad is positioned on the Bernoulli plate.

DESCRIPTION OF THE PREFERRED EMBODIMENT

Figures 1, 5:
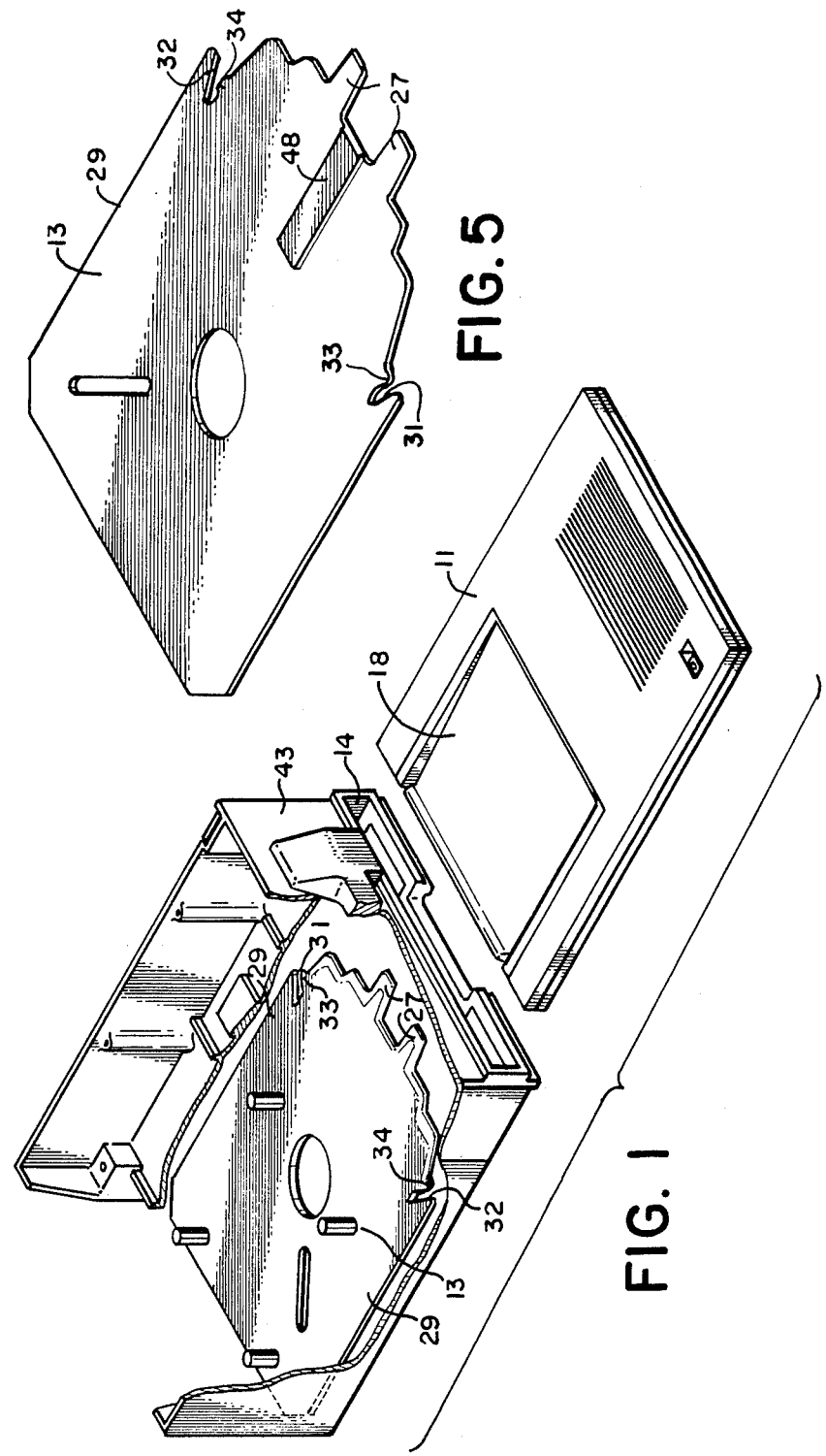
Figure 2:
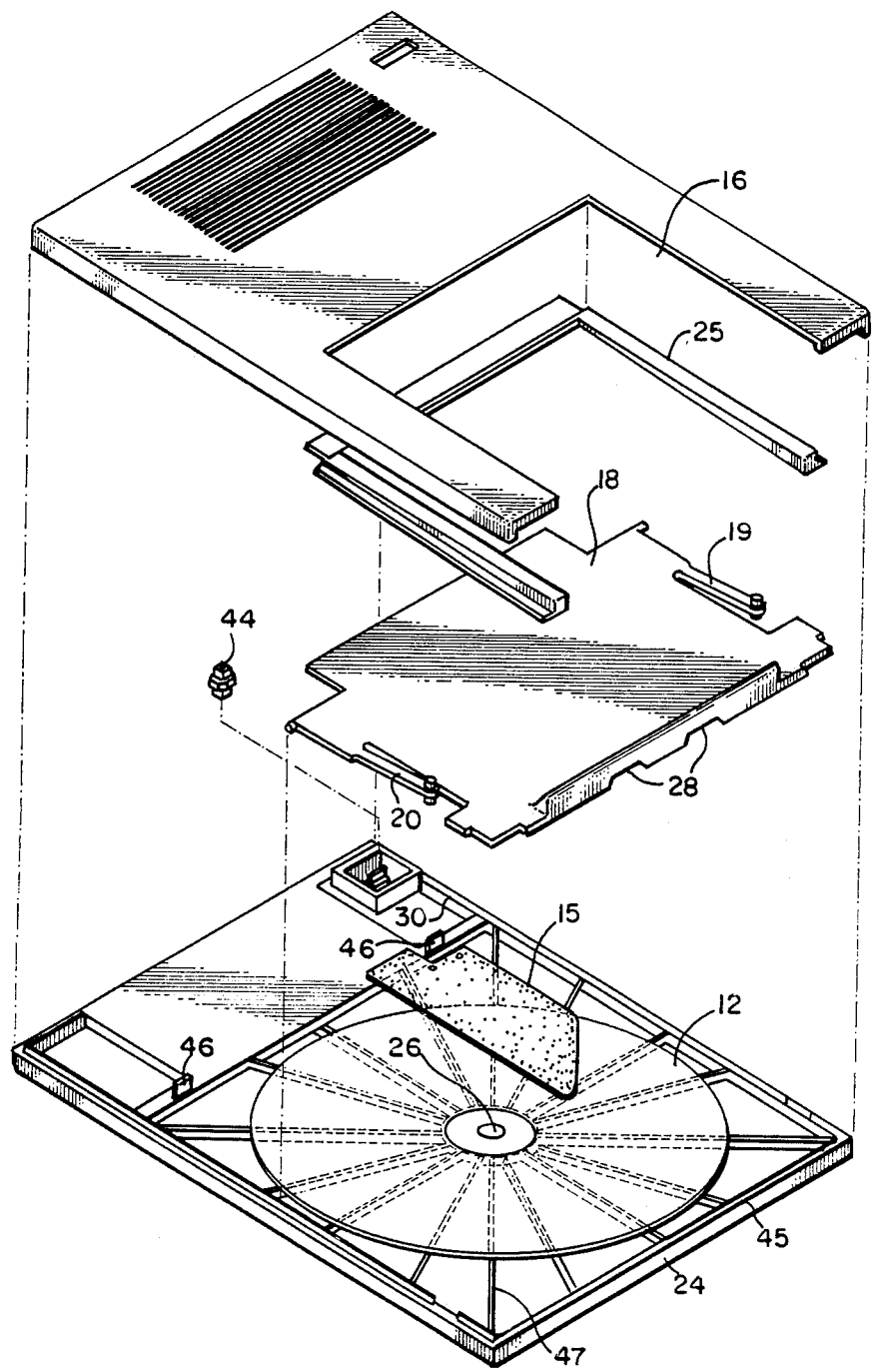

The magnetic disk cartridge 11 has a rigid enclosure containing the flexible magnetic disk 12. The cartridge 11 is for use with a disk drive of the type having a fixed Bernoulli plate 13 against which the magnetic disk 12 is rotated in read/write relationship when the cartridge has been inserted through an opening 14 in the front plate of the disk drive. In accordance with the present invention a flexible pad 15 is positioned within the enclosure of the cartridge 11. When the cartridge 11 is inserted into the disk drive, the flexible pad 15 is between magnetic disk 11 and Bernoulli plate 13. The pad 15 prevents the disk 12 from clinging closely to the plate 13, a phenomenon commonly referred to as ringing.

The pad 15 is fabricated of a soft, flexible material, which in a preferred embodiment is a blend of rayon and polypropylene. The rayon-polypropylene blend is bonded by spot heat welds to a backing of polyvinylchloride or polycarbonate material which adds some rigidiy, but which has the desired flexibility to maintain the soft surface in contact with the disk as it is rotated. The pad 15 may be impregnated with a disk lubricant to provide continued renewal of the lubricant on the disk surface, thereby prolonging its life.

Cartridge 11 has an opening 16 on one side, through which the disk is contacted and rotated by motor 17. A slider 18 normally closes the cartridge opening 16. When the cartridge is inserted into the disk drive, Bernoulli plate 13 engages the slider to move it to an open position in which the disk can be rotated.

The slider 18 is securely locked shut by the spring loaded tabs 19 and 20 which engage locking recesses, one of which is shown at 22, molded into the cartridge top 23. In the closed position, the front edge of the slider 18 is preloaded against the front edge of the cartridge base 24 by spring loaded tabs 19 and 20. This is done to avoid a gap along the front edge of the cartridge. With the slider 18 preloaded in this manner, a second spring 25 is required to seal the triangular space between the cartridge top 23 and slider 18. This locking mechanism is entirely inside the cartridge and cannot be seen by the user.

In order to make use of the media which is securely stored in the cartridge, several things must occur when the cartridge is inserted in the machine. The object of loading the cartridge is to place the media in the proper relation to the Bernoulli plate and attach the disk hub 26 to the drive motor (not shown) so that when the motor is activated, the disk will spin up and become attracted to the plate 13 as a result of the Bernoulli effect.

As the front of the cartridge enters the disk drive, tapered points 27 on the plate 13 engage recessed ramps 28 on the slider 18, forcing slider 18 to raise, thereby opening a gap in the front of the cartridge. This same action guarantees the disk will be retained in the cartridge base 24 below the plate 13 during insertion. As insertion continues, the cartridge is properly guided by the edges 29 of the Bernoulli plate 13, which slides in internal grooves 30, running the length of the cartridge side walls.

The slider locking mechanism is disengaged as follows. Ramps 31 and 32 on the outer edges of the plate engage the spring loaded tabs 19 and 20 on the slider, forcing them towards the center of the cartridge, thereby disengaging them from recesses 21 and 22. The spring loaded tabs 19 and 20 engage channels 35 and 36 along the inside top surface on both sides of the box which forms the cartridge. The spring loaded tabs 19 and 20 are now hooked securely behind the interlocking tabs 33 and 34 on the Bernoulli plate. This interlocking action ensures that the cartridge cannot be removed from the plate unless the spring loaded tabs 19 and 20 are in the recesses 22. This in turn ensures that slider 18 is shut and locked when the cartridge is removed.

Immediately before the spring loaded tabs 19 and 20 are unlocked, the tapered points 27 on the plate 13 have moved over the disk hub 26 in order to retain the hub in the molded recess in the cartridge base 24 during the remainder of the insertion.

As insertion continues (the spring loaded tabs 19 and 20 having been unlocked) the slider is pushed towards the back of the cartridge by the Bernoulli plate 13, thus exposing the top surface of the disk 12 to the bottom surface of the Bernoulli plate 13. When fully inserted, a magnetic hub attached to a drive motor is lowered to the proper height with respect to the plate 13. The disk hub 26 is magnetically attracted to the motor hub 38, and is raised a small distance out of the recess in the cartridge base 24, thus allowing the hub to rotate freely.

To remove the cartridge, the same events occur in reverse order. The slider 18 is pulled shut by the action of the interlocking tabs 33 and 34, and the spring loaded tabs 19 and 20.

Several features in the drive and on the exterior of the cartridge contribute to proper cartridge insertion. The cartridge is prevented from being inserted upside down by the geometry of guide tracks along with matching features on the exterior of the cartridge. During proper insertion, these guide tracks match with grooves which run the length of the cartridge base. If an attempt is made to insert the cartridge upside down, interference prevents the insertion. A second feature ensures that the cartridge is completely closed before it can be removed or inserted. A ridge 42 on the front edge of the slider 18 must pass under bumps on the front panel 43 during insertion or removal. During removal, this ensures that the front edge of the slider 18 is seated on the front edge of the cartridge base 24, and the slider 18 is securely locked. If an attempt to insert a partially opened cartridge (due to damage, failure of some cartridge mechanism, or user tampering) is made, the ridge 42 interferes with these bumps, thus preventing insertion of a cartridge in an unopenable condition.

Other features of the cartridge include a write protect button 44, which, in conjunction with a sensor located in the drive unit, electrically prevents overwriting data, and a cut-away 45 at the front of the cartridge base 24, which ensures clearance between the head and the cartridge during insertion. Stops 46 are molded into the cartridge base 24 which accurately position the cartridge prior to engaging the drive motor.

A plurality of ridges 47 on the inside surface of the base 24 form air dams. The function of the air dams is to reduce the Bernoulli attraction of the disk to the cartridge base 24, allowing the use of Bernoulli technology in a smaller package. The goal of the reduced attraction to the base is a reduction of the required head/coupler aggressiveness, which in turn reduces the likelihood and rate of media wear and damage.

A modification of the invention is shown in FIG. 5 wherein the pad 48 is positioned in a groove in the Bernoulli plate 13. In both embodiments, the pad is between the disk 12 and the Bernoulli plate 13, and in both embodiments the pad reduces ringing of the disk. Other modifications are within the true spirit and scope of the invention. The appended claims are, therefore, intended to cover all such modifications.

What is claimed is:

1. A disk cartridge for use with a disk drive of the type having a fixed plate against which a disk is rotated in read/write relationship with a head, said cartridge comprising:
   an enclosure containing said disk; and
   a flexible pad disposed between said plate and said disk when said cartridge is inserted into said disk drive, said pad being fabricated of a soft, moisture-absorbent material which is co-extensive with a portion of the surface of said disk, said pad preventing said disk from clinging closely to said plate.

2. The disk cartridge recited in claim 1 wherein said pad is positioned in said enclosure.

3. The disk cartridge recited in claim 1 wherein said pad is positioned on said plate.

4. The disk cartridge recited in claim 1 wherein said material is a rayon polypropylene blend.

5. The disk cartridge recited in claim 1 wherein said rayon polypropylene material is attached to a backing of polyvinylchloride material.

6. The disk cartridge recited in claim 4 wherein said rayon-polypropylene material is attached to a backing of polycarbonate material.

7. The disk cartridge recited in claim 1 wherein said pad is fabricated of a moisture-absorbent material.

8. The disk cartridge recited in claim 1 wherein said enclosure is a rigid box containing said disk, said box having an opening on one side thereof through which said disk is rotated in said read/write relationship;
a slider which normally closes said opening, said slider being engaged by said plate when said cartridge is inserted into said drive to move said slider to an open position in which said disk is rotated in said read/write relationship;
locking means for locking said slider in the closed position, said locking means being released by said plate when said cartridge is inserted into said disk drive including;
two spring loaded tabs, one on each side of said slider, said tabs being biased into engagement with locking recesses on the inside cover of said box, said spring loaded tabs being engaged by ramps on the side of said plate to move said tabs out of said recesses when said cartridge is inserted into said disk drive.

9. The disk cartridge recited in claim 8 wherein said box has an open edge, said slider having a portion which normally closes said open edge, said spring tabs engaging the top of said box to bias said slider toward a position in which said portion closes said open edge of said box.

10. The disk cartridge recited in claim 9 wherein said portion of said slider has recessed ramps which are engaged by tapered points on said plate to lift said slider out of said open edge against said bias whereby said plate can enter through said open edge.

11. The disk cartridge recited in claim 10 wherein said box has a channel along the inside top surface on both sides of said box, said recesses being at the front of each channel, said spring loaded tabs being in engagement with said channel as said slider is moved to the open position.

12. A disk cartridge for use with a disk drive of the type having a fixed plate against which a disk is rotated in read/write relationship with a head, said cartridge comprising;
an enclosure containing said disk, said enclosure being a rigid box containing said disk, said box having an opening on one side thereof through which said disk is rotated in said read/write relationship;
a slider which normally closes said opening, said slider being engaged by said plate when said cartridge is inserted into said drive to move said slider to an open position in which said disk is rotated in said read/write relationship;
locking means for locking said slider in the closed position, said locking means being released by said plate when said cartridge is inserted into said disk drive including:
two spring loaded tabs, one on each side of said slider, said tabs being biased into engagement with locking recesses on the inside cover of said box, said spring loaded tabs being engaged by ramps on the side of said plate to move said tabs out of said recesses when said cartridge is inserted into said disk drive.

13. The disk cartridge recited in claim 12 further comprising:
a flexible pad disposed between said plate and said disk when said cartridge is inserted into said disk drive to prevent said disk from clinging closely to said plate.

* * * * *